United States Patent [19]

Lim et al.

[11] 4,269,913

[45] May 26, 1981

[54] NOVEL INORGANIC-ORGANIC COMPOSITE FELT FOR USE IN ALKALINE STORAGE CELLS AND PROCESS FOR MAKING SAME

[75] Inventors: Hong S. Lim, Agoura; Scott A. Verzwyvelt, Thousand Oaks, both of Calif.

[73] Assignee: Hughes Aircraft Company, Culver City, Calif.

[21] Appl. No.: 953,523

[22] Filed: Oct. 23, 1978

[51] Int. Cl.³ ............................................. H01M 2/16
[52] U.S. Cl. .................................. 429/251; 427/244; 427/430.1
[58] Field of Search ................ 429/251, 252; 427/244, 427/245, 246, 430 R

[56] References Cited

U.S. PATENT DOCUMENTS

| | | | |
|---|---|---|---|
| 3,103,461 | 9/1963 | Smith et al. | 429/252 |
| 3,749,604 | 7/1973 | Langer et al. | 429/251 |
| 3,856,549 | 12/1974 | Dauksys | 427/430 R |
| 3,861,963 | 1/1975 | Arrance et al. | 429/251 |

*Primary Examiner*—Donald L. Walton
*Attorney, Agent, or Firm*—Booker T. Hogan, Jr.; W. H. MacAllister

[57] ABSTRACT

An inorganic-organic composite and method for making same wherein chopped zirconium oxide fibers are bonded together with a polymer. This composite is chemically stable and wettable in aqueous alkaline solutions, exhibits physical, chemical and thermal characteristics ideally suitable for use as separators in alkaline storage batteries, especially nickel-hydrogen and nickel-cadmium batteries.

6 Claims, No Drawings

NOVEL INORGANIC-ORGANIC COMPOSITE FELT FOR USE IN ALKALINE STORAGE CELLS AND PROCESS FOR MAKING SAME

RELATED APPLICATIONS

U.S. Application Ser. No. 948,119 filed Oct. 2, 1978 by H. H. Rogers, and applicants S. A. Verzwyvelt and H. S. Lim herein discloses a method of reinforcing a woven zirconium oxide-yttrium oxide fabric with the polymers utilized by applicants herein to form their composite.

U.S. Application Ser. No. 914,461, filed June 12, 1978, by H. H. Rogers discloses a novel separator for use in alkaline storage batteries comprised of zirconium oxide-yttrium oxide cloth reinforced with wettable thermally stable polymers.

U.S. Application Ser. No. 953,511 filed Oct. 23, 1978 by applicant Verzwyvelt herein discloses the use of polybenzimidazole as a wetting agent or surface active coating for polypropylene separators intended for use in alkaline storage batteries, in particular nickel-cadmium batteries.

The rights to each of the inventions described in the above related applications have been assigned to Hughes Aircraft Company of Los Angeles, CA., and are the outgrowth of an ongoing Hughes research project.

FIELD OF THE INVENTION

This invention relates generally to the fabrication of inorganic-organic composites and particularly to the fabrication of porous composite felts exhibiting good chemical stability, good mechanical strength, good wettability to aqueous potassium hydroxide (KOH) electrolytes, good electrolyte retention and good gas permeability.

More specifically, the invention relates to the preparation of polymer bonded felt composites with inorganic fibers.

BACKGROUND OF THE INVENTION

Power sources suitable for use in space communication satellite applications require a long life and high energy density secondary battery. Nickel-hydrogen batteries which have high energy densities are being developed to replace nickel-cadmium batteries utilized for satellite applications.

One of the most important life-limiting factors of these batteries is the separator material. The required separator properties include good chemical stability in aqueous KOH electrolyte, good wettability to the electrolyte, good electrolyte retention, proper gas permeability and proper mechanical strength. The separator of a nickel-hydrogen battery requires high-temperature stability in addition to the properties mentioned above. This additional requirement is due to local hydrogen-oxygen recombination which generates high temperature regions in the separator.

The state-of-art nickel-cadmium batteries for certain space applications use nylon or polypropylene felts as the separator material. Nylon has limited chemical stability in the electrolyte. Polypropylene is intrinsically non-wettable in the aqueous electrolyte even though it is chemically very stable. It requires, therefore, a special treatment to be made wettable and usable as a separator. A problem, however, is that the surface of the polypropylene does not stay wettable for a long enough period of time. For a nickel-hydrogen battery, these organic separators are unacceptable because of the requirement of the high temperature stability in addition to the chemical instability.

An asbestos separator has been used in the nickel-hydrogen batteries. However, it also apparently has a chemical stability problem. The only acceptable separators for use in nickel-hydrogen batteries that the present authors are aware of are those described in U.S. Application Ser. No. 948,119 and U.S. Application Ser. No. 914,461.

PRIOR ART

Inorganic/organic (I/O) separators for use in silver-zinc and nickel-zinc batteries are disclosed by researchers R. D. Walker et al of the University of Florida and Dean W. Sheibley of NASA, Lewis Research Center (see extended abstracts Nos. 24–26 of the Electrochemical Society, Inc. Battery-Electronic Division Spring Meeting, Washington, D.C., May 2–7, 1976). Polyphenylene oxide is employed as a binder material for inert fillers to form flexible composites of asbestos. These separators are not suitable for use in nickel-hydrogen and nickel-cadmium battery applications because of the requirement for a compact structure. The long term stability of asbestos in the presence of KOH solutions is also questionable.

U.S. Pat. Nos. 3,625,770 and 3,625,771 issued to Frank C. Arrance for a "Flexible Matrix and Battery Separator Embodying Same" and a "Battery Separator" disclose and claim polyphenylene oxide impregnated mats comprised of asbestos fibers, with small portions of potassium titanate in short fiber form. Other fillers such as aluminumsilicate and zirconia are mentioned in passing with little or no teachings on the use of these materials. Applicants herein have no direct information on the properties of these separators. However, it is believed that separators prepared from the teachings of the "770" and "771" patents would be impervious to the passage of gas, and tend to dry out because of the use of polyphenylene oxide.

It is therefore an objective of this invention to prepare suitable composite materials for use as a separator for alkaline storage batteries which have most, if not all, of the advantages of the above-identified prior art battery separators, while possessing none of their significant disadvantages. These separators are particularly suitable for use as separators in nickel-hydrogen and nickel-cadmium batteries.

A further objective of this invention is to provide a new and improved porous composite material that is chemically resistant to KOH and is wettable in KOH solutions.

A still further objective of this invention is to provide a composite material of the type described having good mechanical strength as well as the above stated characteristics.

Finally, it is an object of this invention to provide a composite material having good high temperature stability and good gas permeability in addition to all of the above characteristics.

SUMMARY OF THE INVENTION

In seeking to meet all of the above-stated objectives and avoid the disadvantages of the prior art, we have discovered a novel inorganic-organic felt. The invention herein describes a technique of fabrication of an alternate separator which is as good as or potentially better than the previous separators especially for nickel-hydrogen battery applications.

Our felt is comprised of fine zirconium oxide fibers bonded together in a novel manner with a thermally stable polymer that is chemically resistant to and wettable by KOH. The preferred bonding agent for our I/O composites is polybenzimidazole (PBI).

The felt is produced by either a polymer precipitation or evaporative process with suction that yields a porous composite material having a uniform thickness.

DETAILED DESCRIPTION OF THE INVENTION

The present invention is a novel technique of fabricating a felt composite which is suitable for application in alkaline storage batteries such as nickel-hydrogen and nickel-cadmium batteries. The composite felt is fabricated in such a manner so as to be porous and thereby gas permeable. The components used to fabricate the composite felt can be such as to allow for excellent chemical stability in alkaline electrolytes, wettable in the electrolyte and stable at high temperatures.

The invention involves the bonding of fine alkali stable inorganic fibers, such as zirconium oxide fibers, with a polymer which is stable in alkali. Other fibers such as potassium titanate and thorium oxide may be used. Polymers such as polybenzimidazole and polysulfone have been used for this purpose. Other chemically inert polymers such as polybenzoxazole (PBO) and polybenzothiazole (PBT) should be acceptable.

Polybenzimidazole (PBI) has the advantages over polysulfone (PS) of improved wettability to the electrolyte and higher temperature stability.

An important aspect of this invention is that the composite felt prepared by present techniques is gas permeable because of the continuous passage of air and/or liquid through it during the preparation. The fabrication technique of the composite felt may be described as follows:

Inorganic fibers are partially chopped and suspended in water using a blender. This suspension is transferred to a coarse glass frit filter with a sheet of 30 to 60μ pore polytetrafluroethylene (Teflon) filter sheet placed over the frit and the suspension is allowed to settle. Any essentially non-wettable chemically inert filter paper may be used. An unbonded porous felt is then formed between two porous Teflon sheets by placing another sheet of Teflon filter above the settled suspension and filtering the liquid by suction. The water is pulled through the glass frit by suction and the upper Teflon sheet, which functions as a compacting means, compacts the fibers into an unbonded felt. The resultant sandwich of unbonded felt between two Teflon sheets in the filter is placed in an oven and dried at 100° C. to remove all traces of water. The thickness of the felt is controlled by the amount of zirconium oxide fibers applied to a given area of the filter, degree of fiber chopping (small pieces compacting more), and force of suction.

A polymer impregnation solution, e.g., 10% PBI in dimethylacetamide, is then passed through the unbonded felt by suction followed by either the precipitation of the polymer with a liquid flush under continuous suction, e.g., hot water, methanol or acetone; or by solvent evaporation under continuous suction of air through the sandwich structure. The application of continuous suction while the polymer is solidifying or precipitating (sometimes referred to as setting) keeps small pores open through the felt structure and this pore structure allows for better gas permeability and better electrolyte flow through the separator.

Although evaporation of impregnating solvent by air suction provides for an adequate gas permeability, the precipitation method has more advantages than the solvent evaporation method. First, the precipitation method provides more wettable surface than the solvent evaporation method as described previously in U.S. application Ser. No. 948,119. Second, the precipitation method is simpler and less time-consuming and therefore more economic than the solvent evaporation method. In addition, the precipitation method allows for easier removal of the teflon sheets from the bonded composite felt.

After the solvent has been completely removed by continuous suction of air through the separator, or the solvent extracted from the polymer by washing with the precipitating liquid by suction, the entire glass fritted funnel and sandwich are dried in an air oven and the composite felt is separated from the porous Teflon filters.

The felt fabrication process can be readily modified to give variations in the separator properties. The thickness of the composite felt can be varied by the density of the suspension and quantity of the chopped fiber suspension in the filter relative to the filter area. The distribution and gas permeability can also be altered by the degree of chopping of the fibers, pore size of the Teflon filters, amount of polymer left within the felt and force of suction applied. The wettability to the electrolyte, electrolyte retention and ionic conductivity can be varied by the quantity and choice of polymer bonding material. For example, polysulfone can be substituted for PBI, to reduce wettability and electrolyte retention, if it is necessary. The composite felts formed by this technique are expected to be very chemically stable in electrolyte because zirconium oxide fibers and the polymer (PBI and PS) are chemically stable in KOH. In addition, zirconium oxide and polybenzimidazole are stable at high temperatures.

The composite felt formed by this technique using zirconium oxide fiber and PBI demonstrated excellent characteristics for alkaline battery separators. It showed good wettability, good electrolyte retention, high ionic conductivity in the electrolyte wet state, good mechanical strength and gas permeability.

The following examples are typical illustrations of the invention.

EXAMPLE I

A. Felt Formation

1. Zirconium oxide fibers obtained from Zircar Corporation, Florida, New York, are chopped in water with a high speed blender for 30 seconds. The density of this fiber suspension is 1.2 gram of fiber/liter.
2. A 30–60μ Teflon filter is placed upon the frit of a coarse glass fritted funnel. A column of water containing chopped zirconium oxide fibers suspended therein is poured into the funnel. Another 30–60μ Teflon filter sheet is placed gently atop the meniscus of the suspension.
3. Two minutes are allowed for the zirconium oxide fibers to settle out, then suction via a water aspirator is applied pulling the water down and out through the glass frit. This forms a Teflon filter/- zirconium oxide fiber/Teflon sheet sandwich that is dried at 100° C. for 4 hours in an oven to remove any water. Teflon filter sheets are used for additional compacting of the felt structure and easy separation of the bonded composite felt from the fritted funnel.

B. Felt Bonding

1. Prepare a 8% w/v PBI (7 to 10% may be used) solvent solution, by dissolving PBI in dimethylacetamide or dimethylformamide, and apply the solution to the top of the felt sandwich contained in the fritted funnel.
2. Apply suction to the funnel and pull the PBI solution through the felt sandwich thereby causing the fibers of the felt sandwich to become coated with the polymer-solvent solution.
3. Continue applying suction to the funnel for one minute after the application of the polymer solution thereby causing air to flow through the coated felt and create pores throughout said felt.
4. Cause the polymer, coated onto the felt, to set by pouring hot water (100° C.) onto the coated felt, thereby extracting the solvent from the polymer-solvent solution, and pull the water-solvent extract through the felt with the application of continuous suction. This permanently fixes the porous structure created by the withdrawal of the water-solvent extract and flow of air through the felt.
5. Residual traces of water and/or solvent are removed from the polymer impregnated porous felt by drying in an air oven at 105° C. before the Teflon filters are stripped from the felt.

EXAMPLE II

A. Felt Formation

1. Zirconium oxide fibers obtained from ICI "Saffil" are chopped at low speed for 10 seconds.
2. A coarse glass fritted funnel having a 30-60μ Teflon filter placed upon the frit is provided. A column of water containing chopped zirconium oxide fibers suspended therein is poured into the funnel. Another 30-60μ Teflon filter sheet is placed gently atop the meniscus of the suspension.
3. Two minutes are allowed for the zirconium oxide fibers to settle out, then suction via a water aspirator is applied thereby pulling the water down and out through the glass frit. This forms a Teflon filter/zirconium oxide fiber/Teflon sheet sandwich that is dried at 100° C. for 4 hours in an oven to remove any water. Teflon filter sheets are used for additional compacting of the felt structure and easy separation of the bonded composite felt from the fritted funnel.

B. Impregnation

1. The funnel with the dried unbonded felt sandwich is placed in a suction funnel and an 8% solution (6 to 10% w/v may be used) of PS in dimethylformamide is applied.
2. Suction is applied to the funnel and the polymer solution is pulled through the felt structure to coat the fibers with polymer solution. Subsequently, suction is maintained to air dry and fix air passages within the structure of the felt as the solvent is removed.
3. The bonded composite felt is further dried in an air oven at 105° C., removed from the funnel and the Teflon is stripped off.

Having completely disclosed the nature of our invention and provided teachings to enable others to make and utilize the same, the scope of our claims may now be understood as follows:

What is claimed is:

1. A porous inorganic-organic composite separator for use in alkaline storage batteries prepared by the process of:
   a. first providing an aqueous suspension of chopped selected inorganic fibers;
   b. transferring said suspension to a chemically inert filter paper placed over a porous suction apparatus and allowing the fibers of said suspension to settle from said suspension thereby forming a randomly oriented fluffy fiber mat;
   c. providing a compacting means by placing a second sheet of chemically inert filter paper on top of said suspension meniscus and applying suction to said apparatus whereby the liquid component and air is sequentially pulled through said mat;
   d. placing said apparatus containing said mat in an oven whereby said mat is dried;
   e. providing a polymer-solvent coating solution by dissolving from 2-10% of an alkali stable polymer in a selected solvent;
   f. removing said apparatus from said oven and causing said polymer solution to flow through said mat under suction whereby the fibers of said mat are coated with said solution;
   g. flushing said mat with a selected liquid while applying suction to said apparatus to remove said solvent and thereby forming an inorganic-organic composite, consisting of randomly oriented fibers bonded together with an organic polymer, having a multiplicity of pores caused by the flow of said liquid through said mat; and
   h. drying said mat at an elevated temperature to remove residual traces of liquid prior to its use as a separator.

2. A separator prepared by the process of claim 1 wherein said fibers are zirconium oxide fibers and said coating solution is a 7-10% w/v polybenzimidazole dimethylacetamide solution.

3. A method of providing a porous inorganic-organic composite suitable for use in the fabrication of separators for alkaline storage batteries comprising:
   a. first providing an aqueous suspension of chopped selected inorganic fibers;
   b. transferring said suspension to a chemically inert filter paper placed over a porous suction apparatus and allowing the fibers of said suspension to settle from said suspension thereby forming a randomly oriented fluffy fiber mat;
   c. providing a compacting means by placing a second sheet of chemically inert filter paper on top of said suspension meniscus and applying suction to said apparatus whereby the liquid component and air is sequentially pulled through said mat;
   d. placing said apparatus containing said mat in an oven whereby said mat is dried;
   e. providing a polymer-solvent coating solution by dissolving from 2-10% of an alkali stable polymer in a selected solvent;
   f. removing said apparatus from said oven and causing said polymer solution to flow through said mat under suction whereby the fibers of said mat are coated with said solution;

g. flushing said mat with a selected liquid while applying suction to said apparatus to remove said solvent and thereby forming an inorganic-organic composite, consisting of randomly oriented fibers bonded together with an organic polymer, having a multiplicity of pores caused by the flow of said liquid through said mat; and h. drying said mat at an elevated temperature to remove residual traces of liquid prior to its use as a separator.

4. The method of claim 3 wherein said fibers are selected from the group consisting of zirconium oxide, thorium oxide and potassium titanate.

5. The method of claim 4 wherein said polymers are selected from the group consisting of polysulfone, polybenzimidazole, polybenzoxazole, and polybenzothiazole.

6. The method of claim 3 wherein said selected fibers are zirconium oxide fibers, and said solution is comprised of polybenzimidazole dissolved in a selected polar solvent.

* * * * *